(12) United States Patent
Kirkham

(10) Patent No.: US 12,533,741 B2
(45) Date of Patent: Jan. 27, 2026

(54) BRAZED HEAT EXCHANGER

(71) Applicant: Aleris Rolled Products Germany GmbH, Koblenz (DE)

(72) Inventor: Steven Kirkham, Ransbach-Baumbach (DE)

(73) Assignee: Novelis Koblenz GmbH, Koblenz (DE)

( * ) Notice: Subject to any disclaimer, the term of this patent is extended or adjusted under 35 U.S.C. 154(b) by 893 days.

(21) Appl. No.: 17/250,038

(22) PCT Filed: May 15, 2019

(86) PCT No.: PCT/EP2019/062422
§ 371 (c)(1),
(2) Date: Nov. 10, 2020

(87) PCT Pub. No.: WO2019/224063
PCT Pub. Date: Nov. 28, 2019

(65) Prior Publication Data
US 2021/0237183 A1 Aug. 5, 2021

(30) Foreign Application Priority Data

May 22, 2018 (EP) .................... 18173546

(51) Int. Cl.
*B23K 1/00* (2006.01)
*F28D 9/00* (2006.01)
*F28F 21/08* (2006.01)

(52) U.S. Cl.
CPC .......... *B23K 1/0012* (2013.01); *F28D 9/0043* (2013.01); *F28F 21/084* (2013.01); *F28F 2275/04* (2013.01)

(58) Field of Classification Search
CPC .... B23K 1/0012; F28D 9/0043; F28F 21/084; F28F 2275/04; C22C 21/00; B32B 15/016
(Continued)

(56) References Cited

U.S. PATENT DOCUMENTS 6,451,453 B1 * 9/2002 Kucza ................. B32B 15/016
138/140
7,732,059 B2 * 6/2010 Ren ...................... F28F 21/084
165/905

(Continued)

FOREIGN PATENT DOCUMENTS

EP 0718072 A1 6/1996
EP 1059362 A1 * 12/2000 ............ F28F 21/084
(Continued)

OTHER PUBLICATIONS

Korean Application No. 10-2020-7036883, "Office Action", Jun. 2021, 13 pages.
(Continued)

*Primary Examiner* — Danielle M. Carda
(74) *Attorney, Agent, or Firm* — Kilpatrick Townsend & Stockton LLP

(57) ABSTRACT

The invention relates to a brazed heat exchanger incorporating an aluminium alloy baseplate and wherein the baseplate is made from an aluminium alloy having a composition, in wt. %, of: Mn 0.8-1.8, Cu 0.15-1.20, Si 0.25-1.30, Mg 0.10-0.60, Fe ≤0.8, Zn ≤0.3, Ti ≤0.20, Cr ≤0.25, Zr ≤0.25, balance aluminium and impurities.

15 Claims, 2 Drawing Sheets

(58) Field of Classification Search
USPC .......................................................... 420/528
See application file for complete search history.

(56) References Cited

U.S. PATENT DOCUMENTS

| | | | | |
|---|---|---|---|---|
| 2003/0086812 | A1* | 5/2003 | Wittebrood | ............. C22C 21/02 |
| | | | | 420/537 |
| 2003/0121572 | A1 | 7/2003 | Kucza et al. | |
| 2004/0185293 | A1* | 9/2004 | Syslak | ................. B23K 35/288 |
| | | | | 428/654 |
| 2014/0033534 | A1 | 2/2014 | Wintersteen et al. | |
| 2015/0267969 | A1 | 9/2015 | Wittebrood et al. | |
| 2016/0319401 | A1 | 11/2016 | Ando et al. | |
| 2017/0182602 | A1* | 6/2017 | Matsumoto | ............. C22C 21/18 |
| 2021/0187673 | A1* | 6/2021 | Kondo | ..................... C22C 21/04 |

FOREIGN PATENT DOCUMENTS

| | | | |
|---|---|---|---|
| EP | 2017032 | A2 | 1/2009 |
| FR | 2936597 | | 4/2010 |
| JP | 06-065660 | | 3/1994 |
| JP | 2007198660 | A | 8/2007 |
| KR | 10-2014-0000406 | A | 1/2014 |
| WO | 02090031 | | 11/2002 |
| WO | 2005118899 | A1 | 12/2005 |
| WO | 2007131727 | | 11/2007 |
| WO | WO-2017141921 | A1 * | 8/2017 ......... B23K 35/0238 |
| WO | 2017148788 | | 9/2017 |

OTHER PUBLICATIONS

International Application No. PCT/EP2019/062422, International Search Report and Written Opinion, mailed Jun. 4, 2019, 12 pages.
European Application No. 19723133.5 , "Summons to Attend Oral Proceedings", Feb. 23, 2023, 7 pages.
Korean Application No. 10-2020-7036883 , "Notice of Decision to Grant", Apr. 11, 2023, 2 pages.
Korean Application No. 10-2020-7036883 , "Office Action", Dec. 16, 2022, 10 pages.
Canadian Application No. 3,094,898 , Notice of Allowance, Mailed On May 12, 2022, 1 page.
Canadian Application No. 3,094,898 , Office Action, Mailed On Oct. 6, 2021, 4 pages.
European Application No. 19723133.5 , Office Action, Mailed On Mar. 17, 2022, 6 pages.
European Application No. 19723133.5 , Office Action, Mailed On Nov. 4, 2021, 7 pages.
Burger et al., "Development of Higher Strength Core Alloys—potentials and Limits", 2000, pp. 1-10.
European Application No. 19723133.5 , "Intention to Grant", Oct. 17, 2023, 7 pages.
"Demi-Produits Aluminium", General Knowledge, Document Pechiney Rhenalu, May 1997, 3 pages.
"English Translation of JP 2007198660", Aug. 9, 2007, 9 pages.
"Heat Exchanger Aluminum", General Knowledge, Aleris, 2014, 12 pages.
"The Aluminium Automotive Manual", General Knowledge, Applications—Power Train—Heat Exchanges, 2011, 46 pages.
European Application No. 19723133.5, "Notice of Opposition", Dec. 20, 2024, 19 pages.
European Application No. 19723133.5, "Notice of Opposition", Jan. 15, 2025, 2 pages.
Mexican Application No. MX/A/2020/012465, "Notice of Allowance", Feb. 17, 2025, 3 pages.
Mexican Application No. MX/A/2020/012465, "Office Action", Oct. 22, 2024, 4 pages.

\* cited by examiner

BRAZED HEAT EXCHANGER

FIELD OF THE INVENTION

The invention relates to a heat exchanger comprising various components and subjected to a brazing cycle to interconnect the various components together into a unitary brazed assembly, and wherein the heat exchanger incorporates an aluminium alloy baseplate as a structural component.

BACKGROUND TO THE INVENTION

Heat exchangers and other similar equipment, such as condensers, evaporators and the like for use in car coolers, air conditioning systems, industrial cooling systems, etc. usually comprise a number of heat exchange plates or tubes (e.g. extruded or sheet material folded into the form of a tube) arranged in parallel between two headers, each tube joined at either end to one of the headers. Corrugated fins are disposed in an airflow clearance between adjacent heat exchange tubes and are brazed to the respective tubes. Alternative arrangements are known in the art. The various components are commonly joined to each other by brazing. In a brazing process, a brazing filler metal or brazing alloy, or a composition producing a brazing alloy upon heating, is applied to at least one portion of the substrate to be brazed. After the substrate parts or components are assembled, they are heated until the brazing metal or brazing alloy melts to form a unitary brazed assembly following cooling. The melting point of the brazing material is lower than the melting point of the aluminium substrate or aluminium core sheet. The brazing material or brazing alloy is commonly made of a 4XXX-series alloy comprising silicon in an amount in a range of 4% to 20% as its main alloying constituent, and preferably is in the range of about 6% to 14%. The brazing material may be coupled or bonded to an aluminium core alloy in various ways known in the art, for example by means of roll bonding, cladding spray-forming, semi-continuous or continuous casting processes or mechanical assembly processes. These brazing materials have a liquidus temperature typically in the range of about 540° C. to 615° C.

Patent document WO 2017/148788 A1 discloses a heat exchanger incorporating at least one component made from a rolled 6XXX-series aluminium alloy having a composition, in wt. %, of Si 0.2-1.3%, Mg 0.3-1.3%, Cu up to 0.80%, Fe 0.05-1.0%, Mn 0.05-0.70%, optionally one or two elements selected from the group 0.05-0.35% Zr and 0.04-0.35% Cr, Zn up to 0.25%, Ti up to 0.25%, balance unavoidable impurities and aluminium, and wherein the Fe/Mn ratio is <1.90. The rolled 6XXX-series aluminium alloy can be used in the heat exchanger amongst others as a base plate, a header or a side support.

Patent document US 2004/0185293 A1 discloses a brazing sheet product with an optimized combination of core and on one or both sides of the core a cladding for manufacturing of welded tubes and headers. The core aluminium alloy has, in wt. %, 0.7-1.5% Mn, up to 0.6% Si, up to 0.6% Fe, up to 0.6% Zn, up to 1.0% Cu, up to 0.4% Mg, up to 0.5% Ti, others each up to 0.05% and total up to 0.15%, balance aluminium. In another embodiment, the core aluminium alloy has, in wt. %, 0.7-1.5% Mn, up to 1.2% Si, up to 0.6% Fe, 0.1-2% Zn, up to 1.0% Cu, up to 0.4% Mg, up to 0.5% Ti, others each up to 0.05% and total up to 0.15%, balance aluminium.

Patent document FR 2936597 discloses a heat exchanger and a method of manufacturing thereof by means of flux-free brazing in a controlled atmosphere at a temperature between 580° C. and 620° C. The heat exchanger is built up from a series of tubes kept together by means of two headers and fins positioned between the tubes. The core alloy of the tubes is made from an aluminium alloy having, in wt. %, 0.5-0.7% Si, <1.0% Fe, 0.3-1.0% Cu, 0.3-2.0% Mn, <6% Zn, <0.1% Ti, <0.3% Zr, <0.3% Cr, <2.0% Ni, <2.0% Co, <0.5% Bi, <0.5% Y, 0.3-3.0% Mg, others each <0.05% and total <0.15%, balance aluminium.

Various brazed heat exchanger assemblies incorporate a relative thick baseplate or mounting plate to which the various cooling components are joined by means of brazing. The baseplate may have passages or connections for a liquid coolant and for the medium to be cooled, e.g. an oil. The baseplate is also used for mounting the whole brazed heat exchanger assembly to a substructure or submodule. To that effect, the baseplate can be provided with one or more bores or holes through which, for example, bolts can be inserted for securing the brazed heat exchanger to the substructure.

Important characteristics of the baseplate are the pre- and post-braze strength, hardness, scratch resistance, good flatness, and surface quality as baseplates are often used as a sealing surface.

Frequent commercially used aluminium alloys for manufacturing baseplates used for brazed heat exchanger assemblies are clad and unclad 5XXX, 6XXX, or 7XXX-series aluminium alloys, e.g. AA5052, AA6061 and AA6063, the chemical composition of which are given in Table 1 below.

TABLE 1

Aluminium alloy composition of the most used prior art alloys for as baseplate material in brazed heat exchangers and as registered with the Aluminium Association.

| Alloy | Element | | | | | |
|-------|---------|---|---|---|---|---|
|       | Mg | Si | Fe | Cu | Mn | Cr |
| AA5052 | 2.2-2.8 | <0.25 | <0.40 | <0.10 | <0.10 | 0.15-0.35 |
| AA6061 | 0.8-1.2 | 0.40-0.8 | <0.7 | 0.15-0.40 | <0.15 | 0.04-0.35 |
| AA6063 | 0.45-0.9 | 0.20-0.6 | <0.35 | <0.10 | <0.10 | <0.10 |

For each alloy, the balance is made by Zn as an impurity (commonly < 0.25% or lower) and Ti (commonly < 0.15% or lower), unavoidable impurities and the remainder is aluminium.

However, these aluminium alloys are not ideal for brazing due to metallographic braze related defects, such as excessive Si diffusion or the formation of braze voids, as known to those skilled in the art. These alloys can be sensitive to LFM (Liquid Film Migration) during brazing which undermines amongst others the joint quality.

DESCRIPTION OF THE INVENTION

As will be appreciated herein, except as otherwise indicated, aluminium alloy designations and temper designations refer to the Aluminium Association designations in Aluminium Standards and Data and the Registration Records, as published by the Aluminium Association in 2018 and are well known to the person skilled in the art. The temper designations are laid down in European standard EN515.

For any description of alloy compositions or preferred alloy compositions, all references to percentages are by weight percent unless otherwise indicated.

As used herein, the term "about" when used to describe a compositional range or amount of an alloying addition means that the actual amount of the alloying addition may vary from the nominal intended amount due to factors such as standard processing variations as understood by those skilled in the art.

The term "up to" and "up to about", as employed herein, explicitly includes, but is not limited to, the possibility of zero weight-percent of the particular alloying component to which it refers. For example, up to 0.25% Zn may include an alloy having no Zn.

It is an object of the invention to provide a brazed heat exchanger assembly incorporating an aluminium alloy baseplate as a structural member or component thereof and wherein the baseplate is made from an aluminium alloy offering increased post-braze strength in combination with good brazability and component joint strength.

This and other objects and further advantages are met or exceeded by the present invention providing a brazed heat exchanger assembly and incorporating an aluminium alloy baseplate as a structural component and wherein the baseplate (or mounting plate) is made of an age-hardenable 3XXX-series aluminium alloy having a composition, in wt. %:

Mn 0.8%-1.8%,
Cu 0.15%-1.20%,
Si 0.25%-1.30%,
Mg 0.10%-0.60%,
Fe up to 0.8%, preferably up to 0.4%,
Zn up to 0.3%, preferably up to 0.25%,
Ti up to 0.20%,
Cr up to 0.25%,
Zr up to 0.25%,
balance aluminium and impurities each up to 0.05%, total up to 0.20%.

In accordance with the invention, it has been found that the aluminium alloy provides an increased post-braze strength due to an ageing effect of the aluminium alloy, both by natural ageing at ambient temperature and artificial ageing when in service at temperatures above 50° C., or when a dedicated post-braze artificial ageing heat treatment is performed on the whole brazed heat exchanger. This allows for the construction of a thinner gauge baseplate component and thereby a desirable weight saving of the overall weight of the unitary brazed heat exchanger assembly, which is important for modern cars requiring to fulfill low emission targets.

The aluminium alloy baseplate according to this invention avoids excessive Si diffusion during the brazing operation in which the cooling assembly is brazed to the baseplate as a structural component and together forming the unitary brazed assembly, which can otherwise limit filler size and component structural integrity, and causes localised clad material erosion, as Si diffusing into the Al—Mn baseplate material from the liquid clad to form alpha-AlMnSi precipitates.

And compared to standard 5xxx- and 6xxx-series aluminium base materials, in particular AA5052, AA6061, and AA6063, an increased joint strength was obtained between the baseplate and the cooling assembly when using the baseplate material according to this invention.

The main alloying element in the aluminium alloy baseplate is Mn and making the aluminium alloy a 3xxx-series aluminium alloy. In an embodiment the maximum Mn-content is about 1.6%, and more preferably about 1.45%. In an embodiment the lower-limit for the Mn-content is about 1.0%.

In an embodiment of the aluminium alloy baseplate the upper-limit for the Cu-content is about 1.0%, and preferably about 0.90%. The preferred lower-limit for the Cu-content is about 0.45%, and more preferably about 0.50%.

In an embodiment of the aluminium alloy baseplate, the lower-limit for the Si-content is about 0.30%. The preferred upper-limit for the Si-content is about 1.0%, preferably about 0.90%, more preferably about 0.80%, and most preferably about 0.70%.

In an embodiment of the aluminium alloy baseplate, the Mg-content does not exceed about 0.5%, and more preferably does not exceed about 0.40%. A preferred lower-limit for the Mg-content is about 0.20%.

The combined addition of Cu, Si and Mg provides, amongst others, for the increased post-braze strength due to an ageing effect, by natural ageing and artificial ageing.

In an embodiment, Cu+Mg>1.0% for an enhanced post-braze ageing response.

The Fe-content is in a range of up to about 0.8%. At too low levels, the aluminium alloy is commercially less attractive, and some Fe is preferred for formability purposes, improved braze wetting and resistance to sagging. A preferred lower-limit for the Fe-content is about 0.05%, and more preferably about 0.07%, and most preferably about 0.1%. This is to reduce the relative density and corrosion activity of the typical Al(Mn,Fe)Si intermetallics, and AlFeSi and $Al_3Fe$ which can promote pitting corrosion. A preferred upper-limit for the Fe-content is about 0.4%, and more preferably about 0.3%.

In an embodiment, the combined addition of Si+Fe is maximum 0.8% to improve the resistance against pitting.

Zn is not purposively added to the aluminium alloy according to this invention but can be tolerated without adversely affecting relevant properties to a level of up to about 0.3%. In a more preferred embodiment, the upper-limit for the Zn content is about 0.25%, more preferably about 0.15%, and most preferably about 0.05%.

Ti may be present up to about 0.20% to act as a grain refining additive during the casting of an ingot for manufacturing the aluminium alloy baseplate of the invention. Additional Ti may be added, for example, due to their presence in scrap material, in order to increase the strength of the aluminium alloy baseplate by solubility hardening. The total amount of Ti present in the alloy should preferably not exceed about 0.15%, but preferably is less than about 0.10%, and more preferably is less than about 0.05%. A preferred lower limit for the Ti addition is about 0.005%. Ti can be added as a sole element or with either boron or carbon as known in the art serving as a casting aid, for grain size control.

Optionally, each of Zr and Cr can be present in the aluminium alloy baseplate to a level of up to about 0.25% each.

In an embodiment, there is no purposive addition of Zr or Cr at a level exceeding each 0.05%. In a preferred embodiment each of Zr and Cr are present at a level of up to about 0.02%, and more preferably up to 0.01%.

In the aluminium alloy product according to the invention, the balance is made by aluminium, and unavoidable impurities can be present each <0.05% and the total of impurities is <0.2%.

In an embodiment, the baseplate is made from an aluminium alloy having a composition, in wt. %, consisting of: Mn 0.8%-1.8%, Cu 0.15%-1.20%, Si 0.25%-1.30%, Mg 0.10%-0.60%, Fe up to 0.8%, Zn up to 0.3%, Ti up to 0.20%, Cr up to 0.25%, Zr up to 0.25%, balance aluminium and impurities each up to 0.05%, total up to 0.20%, and with preferred narrower compositional ranges as herein described and claimed.

In an embodiment of the invention, the aluminium alloy baseplate is employed as a bare or non-clad rolled product in the brazed heat exchanger such that in use the outer-face of the aluminium alloy can be exposed to the corrosive environment. In this embodiment the thickness of baseplate is in a range of about 1 mm to 12 mm. In an embodiment the thickness is at least about 2 mm, and more preferably at least about 3 mm. It has been found that the aluminium alloy baseplate according to this invention has a high resistance against LFM and does not need to be provided with a protective cladding material to cope with this problem.

In another embodiment, the aluminium alloy base plate has a first side and a second side, and at least one clad layer applied on the first side or the second side. There can be provided a clad layer on both the first side and the second side. The at least one clad layer can be a 1xxx-series, e.g. AA1050, a 4XXX-series brazing material, or a 7XXX-series alloy to provide sacrificial protection to the aluminium alloy baseplate. A suitable 7xxx-series alloy would have a Zn-content of up to about 3%, and would include an AA7072-series alloy.

The at least one clad layer could also be made from a brazing material and preferably made of a 4xxx-series aluminium alloy, and typically having Si as its main alloying constituent in a range of 4% to 14%. Typical alloys within this series are AA4343, AA4045, AA4047, AA4004, AA4104, AA4147, or some near compositional variants thereof. The 4XXX-series alloy may further contain one or more selected from the group consisting of Zn, In, and Sn, in a concentration tailored to effect a desired electrochemical potential within and adjacent to a brazing joint.

In this embodiment, the thickness of baseplate, while excluding the thickness of the clad layer(s), is in a range of about 1 mm to 12 mm. In an embodiment the thickness is at least about 2 mm, and more preferably at least about 3 mm.

The aluminium alloy baseplate is preferably in the pre-braze condition provided in a fully-annealed "O" temper or an "F" temper or in an "H" temper, i.e. in an H1 or H2 or H3 temper. An H1 temper means that the alloy product is strain hardened. An H2 temper means that the alloy product is strain hardened and partially annealed. An H3 temper means that the alloy product is strain hardened and stabilised. In some embodiments, the aluminium alloy baseplate may be strain hardened in accordance with typical H1X or H2X or H3x temper practices, where X is a whole number from 0 to 8, e.g. H12, H14, H24 and H32 temper. In particular an H14 temper avoids or at least reduces problems associated with LFM.

The aluminium alloy baseplate used in the heat exchanger according to this invention is being cast into rolling feedstock, for example by means of DC-casting or continuous strip casting, and thereafter preferably homogenized prior to being down gauged by means of rolling to final gauge, for example by hot rolling and optionally also by cold rolling.

The present invention also relates to the use or a method of use of the aluminium alloy baseplate as described herein, either as a bare product or having at least one clad layer on one of its sides, for use as a structural material or structural component in a brazed heat exchanger.

In particular, the brazed heat exchanger is a radiator, an oil cooler, a heater core, an evaporator, a chiller, a (water) charge air cooler, or a condenser, or similar applications, and assemblies which are produced by joining via brazing various components, e.g. plates, tubes, headers, fins, side supports and the like and subjected to a brazing cycle to interconnect the various pieces or components together into a unitary brazed assembly, mainly for the purpose of exchanging heat.

In an embodiment the brazed heat exchanger is an oil cooler.

In an embodiment the brazed heat exchanger is a water charge air cooler.

In an embodiment the brazed heat exchanger is a chiller.

The invention shall also be described with reference to the appended figures.

Figure 1:
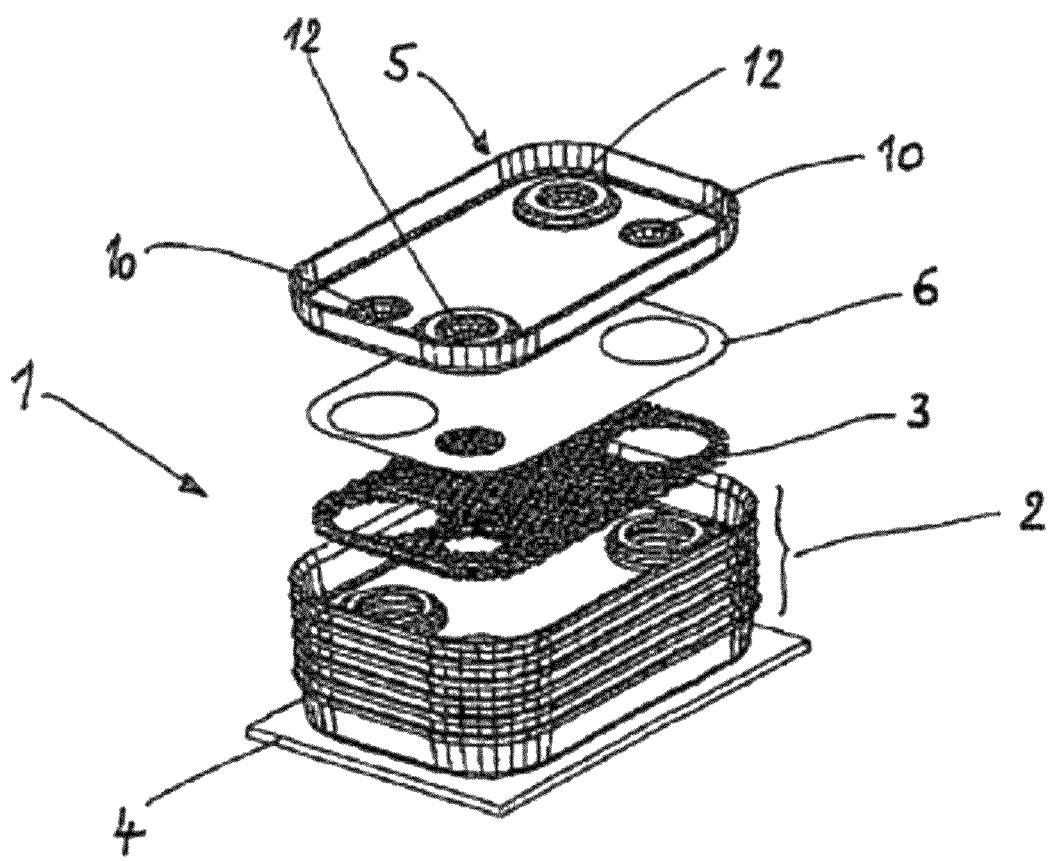
FIG. 1 shows a drawing of the construction of a stacked plate oil cooler in a partially exploded illustration; however, the invention is not to be limited to this specific configuration of an oil cooler.

FIG. 1 shows schematically an example of the construction of a stacked plate oil cooler 1 which is constructed from a multiplicity of stacking plates 2 and metal turbulence plates 3 (turbulence inserts) arranged between said stacking plates 2. The stacked plate oil cooler 1 is closed off by means of a baseplate 4 and a cover plate 5. An intermediate metal plate 6 is inserted between the uppermost metal turbulence plate 3 and the cover plate 5. Connections for the oil and a liquid coolant are arranged in the relative thick baseplate 4 but cannot be seen or are not illustrated in this FIG. 1. In contrast, the cover plate 5 is closed; it has, in this embodiment, stamped impressions 10, 12. In this example the baseplate 4 can be made of the aluminium alloy according to the invention providing a good balance of amongst others brazability, increased post-braze mechanical strength enabling down-gauging of the baseplate thickness, and an increased joint strength between the baseplate and the cooling assembly.

Figure 2:
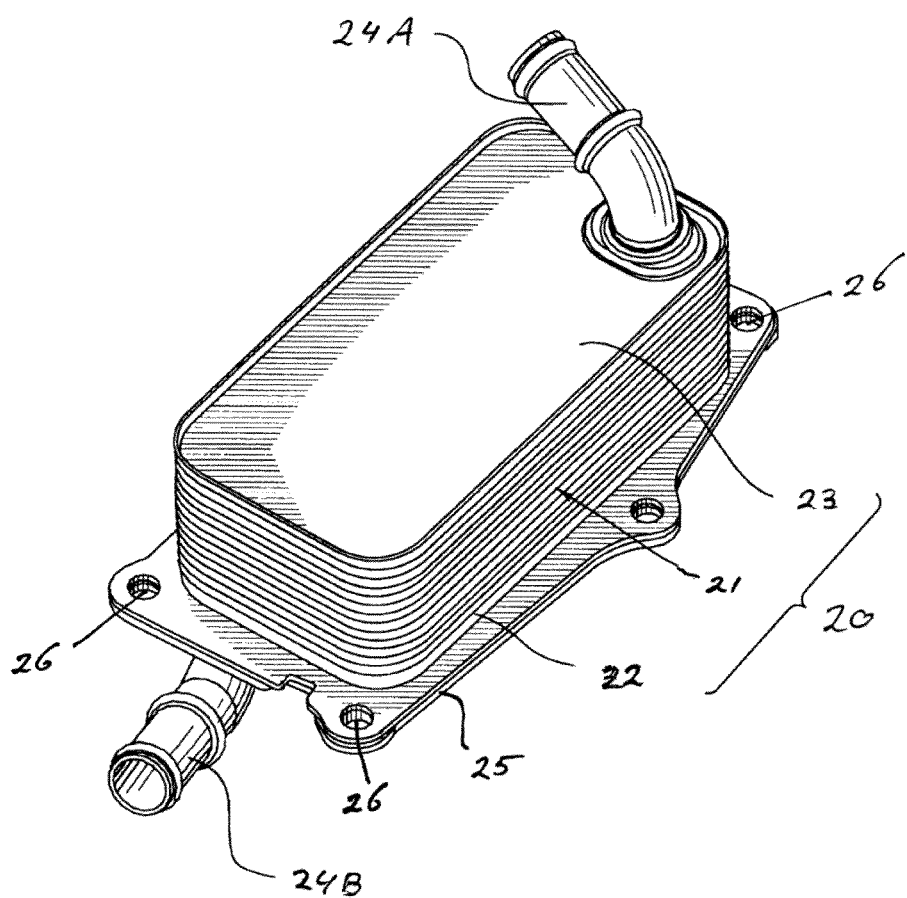
FIG. 2 shows a drawing of another a heat exchanger assembly comprising a stacked plate oil cooler construction incorporating a baseplate.

FIG. 2 shows schematically another example of a unitary brazed heat exchanger assembly comprising of a stacked oil cooler construction 20 which is constructed from a multiplicity of staked plates 21 arranged between two end plates 22, 23, and a pair of coolant fittings 24A brazed to end plate 23 and coolant fitting 24B brazed to end plate 22 through a passage (not shown) in baseplate 25. The baseplate 25 is incorporated in the heat exchanger assembly via a brazing joint to the oil cooler construction 20. The baseplate is provided with a plurality of bores or holes 26 through which the shafts of for example bolts (not shown) or other fastener means can pass such that the brazed heat exchanger assembly can be secured to a mounting surface (not shown). For example, the mounting surface can be a cast or moulded structure and can be metallic structure or a plastic structure. Further, in this example, the baseplate 25 can be made of the aluminium alloy according to the invention providing a good balance of amongst others brazability, increased post-braze mechanical strength enabling down-gauging of the baseplate thickness, and an increased joint strength between the baseplate and the cooling assembly.

Having now fully described the invention, it will be apparent to one of ordinary skill in the art that many changes and modifications can be made without departing from the spirit or scope of the invention as herein described.

The invention claimed is:

1. A brazed heat exchanger incorporating an aluminum alloy baseplate as a structural component and wherein the aluminum alloy baseplate is made from an aluminum alloy comprising a composition, in wt. %, of:

Mn 0.8-1.8,
Cu 0.45-1.20,

Si 0.25-1.30,
Mg 0.10-0.60,
Fe up to 0.8,
Zn up to 0.3,
Ti up to 0.20,
Cr up to 0.25,
Zr up to 0.25,
balance aluminum and impurities each up to 0.05%, total up to 0.20%, wherein Cu+Mg>1.0%, wherein at least one of Cr and Zr is present in the aluminum alloy baseplate, and wherein the aluminum alloy baseplate is non-clad, wherein the aluminum alloy baseplate has a thickness in a range of from 1 mm to 12 mm.

2. The brazed heat exchanger according to claim 1, wherein the aluminum alloy baseplate has a Mn-content of from 0.80% to 1.6%.

3. The brazed heat exchanger according to claim 1, wherein the aluminum alloy baseplate has a Cu-content of from 0.45% to 1.0%.

4. The brazed heat exchanger according to claim 1, wherein the aluminum alloy baseplate has a Mg-content of from 0.10% to 0.5%.

5. The brazed heat exchanger according to claim 1, wherein the aluminum alloy baseplate has a Mg-content of from 0.20% to 0.60%.

6. The brazed heat exchanger according to claim 1, wherein the aluminum alloy baseplate has a Si-content of from 0.25% to 1.0%.

7. The brazed heat exchanger according to claim 1, wherein the aluminum alloy baseplate has a Ti-content of up to 0.15%.

8. The brazed heat exchanger according to claim 1, wherein the aluminum alloy baseplate has a Zn-content of up to 0.15%.

9. The brazed heat exchanger according to claim 1, wherein the aluminum alloy baseplate in a pre-braze condition is provided in a strain hardened temper.

10. The brazed heat exchanger according to claim 1, wherein the aluminum alloy baseplate in a pre-braze condition is provided in a H14 temper.

11. The brazed heat exchanger according to claim 1, wherein the brazed heat exchanger is a radiator, a condenser, an evaporator, an oil cooler, a charge air cooler, or a heater core.

12. The brazed heat exchanger according to claim 1, wherein the aluminum alloy baseplate has a Cr-content of 0.05 to 0.25 wt. %.

13. The brazed heat exchanger according to claim 1, wherein the aluminum alloy baseplate has a Zr-content of 0.05 to 0.25 wt. %.

14. The brazed heat exchanger according to claim 1, wherein the aluminum alloy baseplate has a Si-content of 0.70 to 1.30 wt. %.

15. A product comprising the aluminum alloy baseplate according to claim 1, wherein the product is a structural material or component in a heat exchanger.

* * * * *